United States Patent [19]
Strickler et al.

[11] Patent Number: 5,227,936
[45] Date of Patent: Jul. 13, 1993

[54] DISK RECORDING DEVICE HAVING MOLDED PARTS AND METHOD OF FABRICATION EMPLOYING OUTSERT MOLDING

[75] Inventors: Mike T. Strickler; Richard L. Colbert, both of Boise, Id.

[73] Assignee: Hewlett-Packard Company, Palo Alto, Calif.

[21] Appl. No.: 945,992

[22] Filed: Sep. 15, 1992

Related U.S. Application Data

[63] Continuation of Ser. No. 531,992, Jun. 1, 1990, abandoned.

[51] Int. Cl.$^5$ .............................................. G11B 33/14
[52] U.S. Cl. .................................. 360/97.02; 360/106
[58] Field of Search ........................ 360/97.01-97.04, 360/105-106

[56] References Cited

U.S. PATENT DOCUMENTS

| | | | |
|---|---|---|---|
| 4,825,315 | 4/1989 | Hirose | 360/97.01 |
| 5,014,152 | 5/1991 | Sasaki | 360/135 |
| 5,077,624 | 12/1991 | Nakanishi | 360/85 |

*Primary Examiner*—A. J. Heinz
*Attorney, Agent, or Firm*—E. F. Oberheim

[57] ABSTRACT

A disk type of magnetic recording device having a support plate in which parts, normally separately fabricated and separately attached to the support in assembling the device, are simultaneously outsert molded on the support by indexing clamping the support, which has openings therethrough where parts are to be secured, between upper and lower sections of a mold, each mold section having cavities at such openings defining part configurations and/or attach flanges, and thereafter outsert molding the parts by injecting a fluid plastic material such as polycarbonate, into the mold, completely filling the cavities.

10 Claims, 2 Drawing Sheets

DISK RECORDING DEVICE HAVING MOLDED PARTS AND METHOD OF FABRICATION EMPLOYING OUTSERT MOLDING

This is a continuation of copending application Ser. No. 07/531,992 filed on Jun. 1, 1990, now abandoned.

TECHNICAL FIELD

This invention relates to disk type recording devices and methods of fabrication thereof employing outsert molding.

RELATED APPLICATION

A copending application Ser. No. 07/532,470 of Mike T. Strickler and Jeffery G. Patrick, entitled "Disk Drive Crash Stop", filed on the same date as this application and assigned to the assignee of this invention, is related to this application.

BACKGROUND OF THE INVENTION

Disk type recording devices, whether magnetic, magneto resistive or optical types, are high precision devices requiring the precise location and support of parts which interact in the positioning of a transducer head for recording or reading purposes. The recording devices are fabricated and assembled in a clean environment and require a clean environment in which to function.

Fabrication techniques usually involve the fabrication of individual parts, and in some instances pieces of parts, and thereafter their assembly in a clean environment upon a chassis, such as a base or support plate. The use of fasteners, such as screws, rivets, swaged connections, etc., or adhesives, to join numerous parts, requires extreme care that location errors due to fabrication tolerances do no occur.

The application of fasteners or adhesives to such parts and the use of tools on the fasteners, can damage the fasteners and/or the parts, or cause their mislocation. Particles from part and/or fastener damage, or adhesive contamination, may contaminate the clean environment and may be the cause of poor yields or the malfunction of the recording device at a later date.

Fabrication and design techniques for improving recording devices with respect to performance, reliability, longevity and cost reduction have been under investigation since their introduction. Accuracy in recording and playback, or readback, and, in some applications, together with increasing recording density, have placed increasing and unyielding demands on precision in product fabrication using conventional assembly techniques.

SUMMARY OF THE INVENTION

This invention presents a significant departure from practiced design and fabrication techniques in recording devices, achieving precision in repeatability of part fabrication and location, together with a reduction in part count, inventory, and assembly operations, to the end of obtaining an improved product which costs less to manufacture.

Outsert molding techniques are employed in fabricating the improved recording device. To provide an explicit and enabling description of the present invention and to present the presently known best mode for its practice, the invention is described in connection with a rotary actuator type of magnetic disk memory drive or file. The invention's application to the fabrication of other types of recording devices has been noted hereinabove and will be readily apparent to those skilled in the design and fabrication of such devices.

In recording devices, having a rotatably mounted disk or stack of disks, on which recordings are made in radially spaced tracks, which are either spiral or concentric, transducers for recording and/or reading, or playback, of disk recordings, and an actuator for radially moving and positioning the transducers over a recorded track, precision is required in the positioning of parts with respect, at least, to the axis of rotation of the disk(s). A support on which the disk(s), the actuator, and related parts are mounted, usually a base or a support plate, is fabricated. Openings are provided through the support plate in locations relative to the axis of rotation of the disk(s), for securing parts such as those which function as actuator mounts and crash stops, for example. Printed circuit board mounts, electrical connector mounts and other parts not related to actuator movement and positioning are positioned in accordance with spatial availability in locations compatible with functional requirements. The support plate is indexed, secured and sealed between the bodies of a split mold which forms cavities on each side of the support for defining the configuration of the part on one or both sides of each opening in the support plate, when the mold material is injected, and for securing and sealing the part on the support through and in the opening.

In particular, but without limitation, parts requiring high precision in location and configuration, and in repeatability in such requirements, are advantageously fabricated by this method. Crash stops configured to establish the limits of movement of the actuator and, hence, the transducer(s) between inner and outer radial limits on the disk, crash stop mounts for preloaded crash stops, actuator latch structures, actuator mounts for linear actuators, are typical examples of parts which can be formed by this procedure.

Other parts or features of lesser criticality with regard to configuration or location, include electrical connectors, filter pockets, flex circuit supports etc., are also advantageously outsert molded.

All of the holes in the support plate used to secure the plastic parts or features are sealed on both sides of the support by the plastic base of a part on one face of the support and a flange on the opposite face or by the base of another integral part, such that mechanical security and an essentially airtight seal are created. This technique allows the low cost creation and attachment to a recorder device base or support of one or several plastic parts or features with one mold shot. Mounting hardware and/or sealing gaskets, or adhesives, are not required. Electrical connector plugs can be molded and sealed in openings in the support, separately or with other parts or features, to provide sealed electrical connections between the transducers and printed circuit boards on the bottom side of the support, thereby eliminating either the routing of flex circuits out of the recorder, or the gasket sealed screw mounting of a through connector.

Very tight tolerances are achievable and repetitively maintainable in the configuration of parts and in their location on the base or support plate, since the support plates are of tight tolerance and can be accurately positioned in the mold assembly by the disk spindle hole and holes for mounting the actuator, or other jig holes referenced to such holes. These tight tolerances are critical with respect to molded parts associated with actuator movement such as crash stops, the actuator latch and the like.

An example of a plastic material suitable for this application, particularly the high precision crash stops, is a glass or carbon filled polycarbonate type of material, which is stiff and dimensionally stable, yet can yield a flexible and resilient structure in particular design configurations, to meet the requirements of the crash stop function for decelerating and precisely stopping an actuator in its limits of movement, yet being deflectable to permit actuator installation past the molded crash stop. This material is internally damped in a degree, in the crash stop configuration, to prevent ringing under actuator impact. Any material which has the characteristics of stiffness, damping, aging stability, dimensional stability, and the strength for this application and which is adaptable to outsert molding, may be used. Other presently known suitable materials include polyphenylene sulfide, polyetherimide, etc.

BRIEF DESCRIPTION OF THE DRAWINGS

A better understanding of this invention may be had from a study of the following specification when considered in conjunction with the accompanying drawings, in which.

BEST MODE FOR CARRYING OUT THE INVENTION

Figure 1:
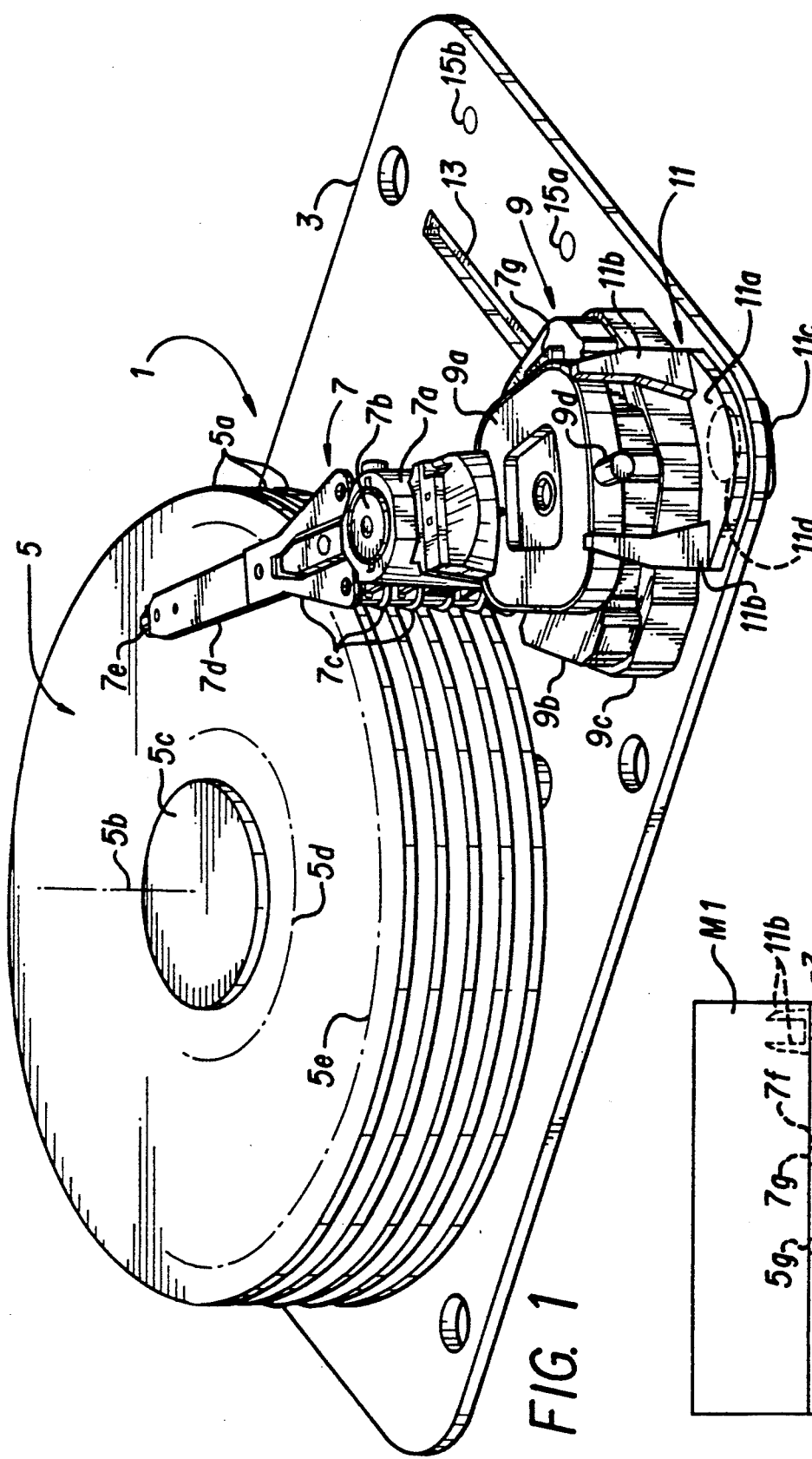
FIG. 1 is an isometric view of a rotary actuator type of magnetic disk drive, embodying the principles of this invention.

The best mode presently known to the applicants for practicing this invention, comprises its application in a rotary actuator type of magnetic disk drive, which is illustrated in FIG. 1. The principles of this invention, however, are also applicable in drives involving linear actuators and in drives or recorders involving magnetoresistive and optical principles in recording and playback or reading modes.

The rotary disk memory drive 1 of FIG. 1 comprises a support 3 such as a base or support plate. An integrated disk stack 5 comprises axially spaced disks 5a. The disk stack 5 is mounted for rotation at constant speed by a motor (not shown), about an axis 5b of a disk spindle structure 5c securing the disk stack.

A rotary actuator 7 comprises a bearing housing 7a which is rotatably mounted about an actuator spindle 7b. A plurality of arms 7c are mounted upon the bearing housing 7a in axially spaced positions in planes adjacent to the surface of the individual disks 5a. Load beams 7d, sometimes also referred to as flexures, attached to the free ends of the arms 7c at their extremities, mount individual magnetic heads 7e. These magnetic heads 7e are disposed in confronting relationship with adjacent surfaces of each of the disks. The actuator 7 is rotated about the actuator spindle 7b to move the magnetic heads 7e to different radial positions over the adjacent surface of a disk 5a for track seeking and track following modes of operation, as is well known, by means of an actuator motor 9.

The coil structure 9a is attached to the bearing housing 7a and the center line of the coil is diametrically disposed with respect to the center line of the arms 7c on the opposite side of the axis of the actuator spindle 7b. In this position the coil structure 9a moves bidirectionally in an arc about the axis of the actuator spindle 7b. The coil structure 9a is disposed between a pair of two-pole permanent magnets, one above and one below the coil structure 9a. Only the lower permanent magnet 9b is shown in this illustration in the interest of clarity. The lower permanent magnet 9b is disposed upon a steel, magnetic flux carrying motor base 9c which is attached to the support plate 3. Bidirectional movement of the coil 9a in its arc in the field of the permanent magnets is achieved, as is well known, by reversibly energizing the coil (not shown) of the coil structure 9a.

The limits of angular mechanical movement of the rotary actuator 7 are determined by a crash stop 11, having a crash stop base 11a on the support plate 3, and circumferentially spaced arms 11b projecting upwardly therefrom, which arms are positioned on opposite sides of a pin 9d radially projecting from the end face of the coil structure 9a between the crash stop arms 11b. Engagement of the pin 9d with the respective crash stop arms 11b determines the opposite limits of angular movement of the actuator 7 and, hence, the inner and outer radial limits of movement of the individual magnetic heads 7e with respect to the surfaces of the respective disks 5a.

As seen in FIG. 1, the position of the left crash stop arm 11b determines the outermost radial position of the magnetic head 7e. This position is usually outside of the outermost data track 5e on the surface of the disk. The crash stop arm 11b on the right, as seen in FIG. 1, determines the innermost position of the magnetic head 7e which is usually between the disk spindle 5c and the innermost track 5d on the surface of a magnetic disk 5a. The crash stop 11 has a lower base or flange 11c on the bottom side of the support plate 3 as seen in FIG. 1, which is an integral part of the crash stop structure 11 by means of the integral connection extending through an opening 11d in the support plate 1. This opening 11d is of any configuration for the purpose of indexing and securing the crash stop against rotary movement. The opening 11d is in a predetermined position at least with respect to the axis 5b of the disk stack.

Figure 4:
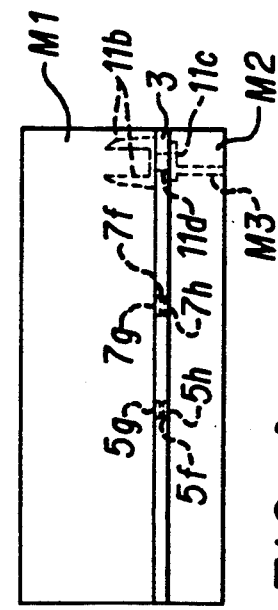
FIG. 4 illustrates the mold arrangement.
Figure 2:
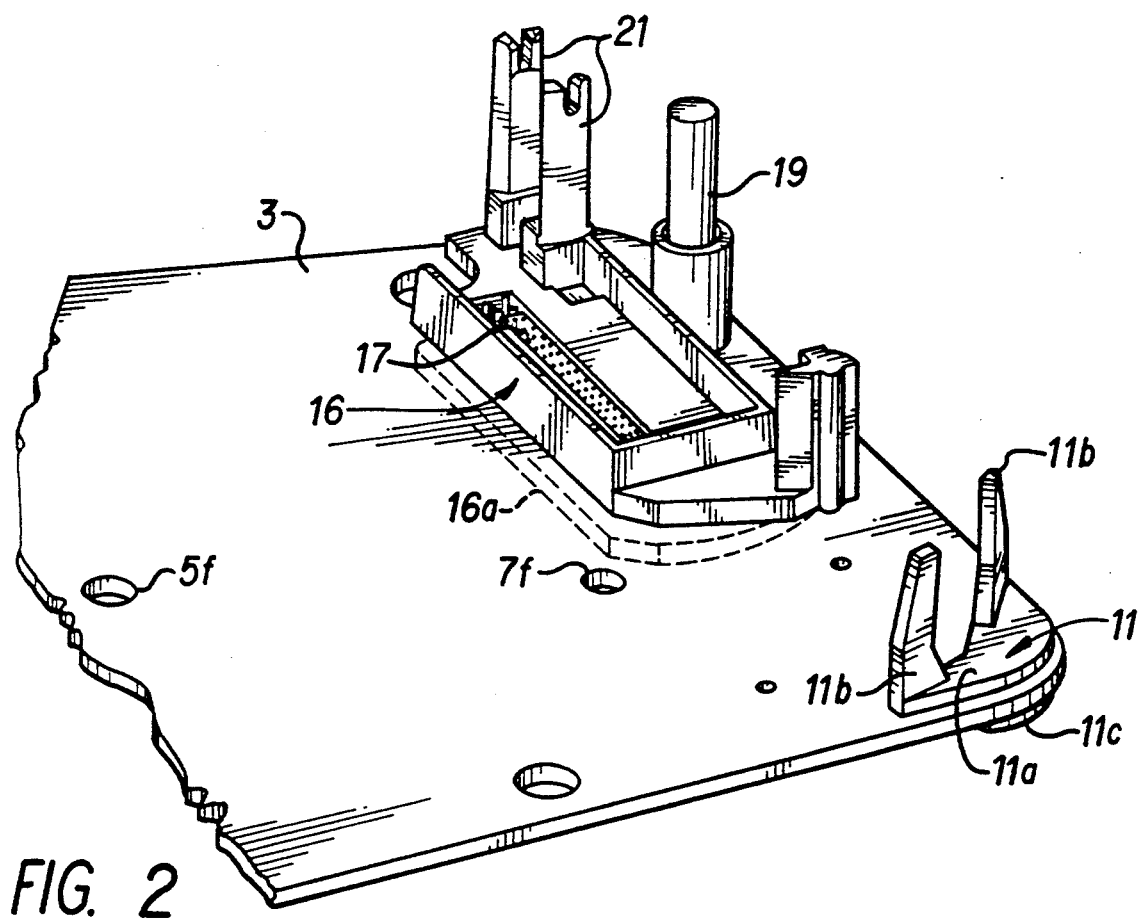
FIG. 2 is an isometric view of outsert molded parts or features of a disk drive of the type of FIG. 1.
Figure 3:
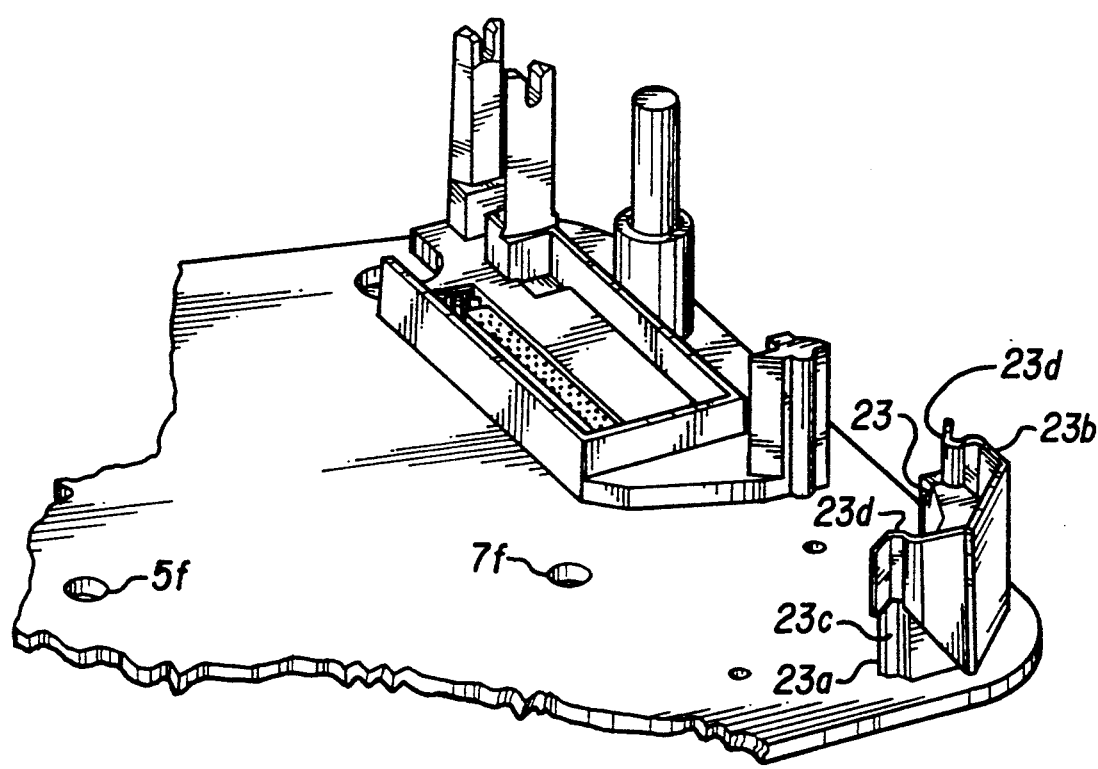
FIG. 3 is an isometric view similar to FIG. 2 showing a different outsert molded crash stop structure.

The base of the disk spindle 5c and the actuator spindle 7b are secured in openings extending through the support 3. These openings in FIGS. 2 and 3 are designated 5f and 7f, respectively, and are the openings which receive the bottom ends of the disk and actuator spindles 5c and 7b, respectively. In FIG. 4, showing the assembled mold, coaxial pins 5g and 5h projecting from opposite mold faces and coaxial pins 7g and 7h projecting from opposite mold faces fit into the respective openings 5f and 7f in the support 3. This precisely indexes the support 3 between the confronting faces of the mold sections M1 and M2 placing the opening 11d for the crash stop 11 at the location of the crash stop cavities in the mold sections M1 and M2. These crash stop cavities are precisely positioned with respect to the openings 5f and 7f, which receive the bases of the disk and actuator spindles 5c and 7b, respectively. Thus, when the crash stop is formed by the injection of a fluid plastic material through an opening into the crash stop cavity, the crash stop is precisely positioned with respect to the axes of the disk and actuator spindles 5c and 7b, and this precision is repeatable. The locations of other cavities in this mold, having critical requirements as to location with respect to the disk spindle 5c and the actuator spindle 7b, may be similarly determined. It is believed that the illustration with respect to the crash stop as seen in FIG. 4 is sufficient in this respect.

The two point indexing of the support plate between the two halves or sections M1 and M2 of the mold is preferred since it provides precise translational and angular positioning of the support 3 with respect to the cavities in the mold which are similarly precisely located with respect to such points. It is apparent, however, that other holes or openings through the support 3 which are precisely related to the openings 5f and 7f may be used in place of the openings 5f and 7f to achieve the same results.

In FIG. 1, additional openings are shown in the support plate 3. These include a rectangular opening 13 and two spaced circular openings 15a and 15b. These are provided for the purpose of mounting additional parts, such as the additional parts which are seen in FIGS. 2 and 3. These parts include a molded outsert 16 and the crash stop 11. The crash stop 11 has been described.

A connector plug 17, usually comprising a multiplicity of pin receptacles, is fitted through the opening 13 and secured and sealed within the confines of the molded outsert 16. The molded outsert 16 is secured to the support 3 by means of integral sections projecting through the openings 15a and 15b, providing an integral connection between the base section of the molded outsert 16 and a flange 16a on the bottom side of the support 3, as seen in dotted outline.

Integral parts of the molded outsert 16 include a latch pivot pin 19 and snap pocket posts or supports 21 provided with bifurcated upper ends, for the purpose of receiving and securing a latch solenoid (not shown) which operates a latch arm (not shown) which is intended to be mounted on the latch pivot pin 19. These parts are not shown since they are not part of this molded outsert. The function of this latch is for the purpose of securing the actuator 7 in that angular position in which the magnetic head 7e is positioned radially inwardly of the innermost track 5d of the disk. This is known as the parked position of the magnetic head in the landing zone which is provided inboard of the innermost track 5d. In this parked position, the latch has an end portion which engages a catch 7g on the coil side of the coil structure 9a. The purpose of this latch is to lock the actuator against any possibility of angular movement when the disk drive is not being used and, for example, is being transported either separately or as a unit with the equipment in which the drive operates. Precision of casting of these parts as to repeatability and configuration and in location, is desirable to minimize the amount of radial disk space appropriated to guarantee that the actuator 7 always latches with the transducer 7e always clear of the innermost data tracks of the disk 5d.

A variation of the crash stop 11 is illustrated in FIG. 3. The differently configured outsert molded crash stop structure is designated 23. It comprises an outsert molded base section 23a, as described hereinabove, and a clip-on spring loaded crash stop 23b. The base section 23a is provided with recesses 23c in its opposite side edges. The crash stop member 23b is of generally U-shaped configuration conforming to the configuration of the base section 23a and has end portions 23d on opposite sides conforming to the shape of the recesses 23c. Prior to installation, the end portions 23d of the spring crash stop 23b are spaced a lesser distance apart than the distance between the bases of the recesses 23c, to provide spring loading when installed. Thus the spring member 23b is conveniently clipped into position on the base section 23c with the end portions 23d engaged in the recesses 23c. Predetermined spring loading of the crash stop at the end portions 23d is provided by this arrangement for the purpose of restricting the angular limits of movement of the rotary actuator without exceeding the G limits on the magnetic heads 23e and their suspensions by which they are attached to the ends of the load beams 7d.

The crash stop 11 need not be outsert molded as a single piece. The crash stop arms 11b may be molded on separate bases at individual holes through the support plate 3 with the same precision as with the single piece crash stop 11.

Although a specific example of the structure of a recording device having parts fabricated according to the teachings of this invention has been described herein, it is apparent that the invention, both as to its structure and to the method of fabrication of that structure is not limited to the type of device herein described and illustrated, but is rather of general application and applicable also, for example, to devices involving linear actuators and to devices involving different recording techniques such as magneto-resistive and magneto-optical techniques for recording and playback or reading.

What is claimed is:

1. A disk type of magnetic recording device, comprising:
    a support having opposite faces;
    a disk spindle disposed on one face of said opposite faces of said support, said disk spindle having an axis;
    a disk rotatably mounted on said spindle for rotation about said axis and having recordings thereon in tracks which are radially spaced;
    at least one transducer;
    an actuator assembly mounting said transducer;
    actuator mounting means at a location on said one face of said support displaced from said axis, movably mounting said actuator assembly to move said transducer along a path to different radial track positions on said disk;
    said support having openings therethrough at different locations, at least one of which openings is associated with a limit of movement of said actuator assembly;
    an outsert molded part on said one face of said support at each of selected openings, each outsert molded part having an integral section extending through the opening thereat in said support and forming an integral part with an enlarged portion against the face of said support opposite said one face, for securing said outsert molded part on said support and sealing said opening, an outsert molded part at at least said one of said selected opening is having a surface disposed at a predetermined distance from said location of said actuator mounting means and at a predetermined distance rom said axis, said surface being positioned to engage said actuator assembly to limit its movement.

2. The recording device of claim 1, in which:
    said at least one of said selected openings is in a predetermined location in said support with respect to the location of said axis and to the location of said actuator mounting means.

3. The invention according to claim 1, in which:
    each outsert molded part is of a plastic material.

4. The invention according to claim 1, in which:
each outsert molded part is of a polycarbonate plastic material.

5. The invention according to claim 1, in which said enlarged portion comprises an outsert molded part having a function different rom that of the outsert molded part which is integral therewith.

6. The invention according to claim 5, in which:
each outsert molded part is of a polycarbonate plastic material.

7. A recording device, comprising:
a support having opposite faces;
at least one disk having recordings in radially spaced tracks in one surface thereof;
means for mounting said disk on one face of said opposite faces of said support for rotation about an axis;
at least one transducer for a disk;
a movable actuator at a location on said one face of said support for supporting said one transducer adjacent to said one surface of said disk for movement to different radial positions on said disk;
motor means for moving said actuator;
said support having an opening therethrough adjacent to said actuator, and
a single piece crash stop structure outsert molded on said support, having a base on said one face of said support, having at least one crash stop projection disposed at a predetermined distance from said location of said movable actuator, and at a predetermined distance from said axis for engaging said actuator means in at least one of two mechanical extremes of movement of said actuator means and having an integral portion extending through said opening and terminating in an enlarged portion on the face of said support opposite to said one face for securing and sealing said crash stop to said support at the location of said opening.

8. The recording device of claim 7 in which:
said outsert molded single piece crash stop structure comprises two crash stop projections integral with said base for engaging said actuator means n each of two mechanical extremes of movement.

9. In a disk recording device, having a support, a disk, spindle means having a spindle attachment location on said support for mounting said disk on said support for rotation about a disk spindle axis, an actuator, a transducer head on said actuator, actuator mounting means having at least one actuator attachment location on said support for movably mounting said actuator to move said transducer head to selected radial locations, the method of fabricating at least one part on at least one face of opposite faces of said support, comprising:
providing a two section mold, each section having a spindle axis reference location and an actuator attachment reference location, one mold section having a cavity defining an individual part having a surface at a location at respective predetermined distances from said spindle axis reference location and said actuator attachment reference location;
providing at least one opening through said support at a location spaced from said spindle attachment location on said support and said actuator attachment location on said support b said respective predetermined distances on said support to place said opening substantially at said cavity;
placing said support between and in contact with said mold sections, indexing said spindle attachment location on said support to said spindle axis reference location of each mold section and said actuator attachment location of said support with said actuator attachment reference location of each mold section, and
injecting a fluid molding material into each cavity in each mold section to mold a part having a portion seated on opposite faces of said support at said opening and integrally connected through said opening.

10. A method for fabricating a support member for a disk drive, comprising:
providing a disk spindle axis location and an actuator location on said support member, and
providing openings through said support member, at least one opening of which is referenced to both locations on said support member, and
outsert molding parts on said support member through said openings, at least one part of which outsert molded parts is a crash stop and is at said one opening.

* * * * *